United States Patent
Arcand et al.

(10) Patent No.: US 11,802,636 B2
(45) Date of Patent: Oct. 31, 2023

(54) CLAMPING DEVICES

(71) Applicant: Saint-Augustin Canada Electric Inc., Saint-Augustin-de-Desmaures (CA)

(72) Inventors: Sebastien Arcand, Saint-Augustin-de-Desmaures (CA); Daniel Garneau, Lévis (CA); Félix Houde, Saint-Raymond (CA)

(73) Assignee: Saint-Augustin Canada Electric Inc., Saint-Augustin-de-Desmaures (CA)

( * ) Notice: Subject to any disclaimer, the term of this patent is extended or adjusted under 35 U.S.C. 154(b) by 0 days.

(21) Appl. No.: 17/414,573

(22) PCT Filed: Dec. 18, 2019

(86) PCT No.: PCT/IB2019/061041
§ 371 (c)(1),
(2) Date: Jun. 16, 2021

(87) PCT Pub. No.: WO2020/128918
PCT Pub. Date: Jun. 25, 2020

(65) Prior Publication Data
US 2022/0057020 A1 Feb. 24, 2022

Related U.S. Application Data
(60) Provisional application No. 62/781,211, filed on Dec. 18, 2018.

(51) Int. Cl.
*F16L 3/10* (2006.01)
*F03D 80/80* (2016.01)
(Continued)

(52) U.S. Cl.
CPC ............... *F16L 3/10* (2013.01); *F03D 80/85* (2016.05); *F16L 3/223* (2013.01); *H02G 3/32* (2013.01)

(58) Field of Classification Search
CPC .. F16L 3/10; F16L 3/223; F03D 80/85; H02G 3/32
(Continued)

(56) References Cited

U.S. PATENT DOCUMENTS 2,356,318 A * 8/1944 Hayman ............... F16L 3/2235
24/135 R
2,361,943 A * 11/1944 Issoglio ................ F16L 3/2235
174/157

(Continued)

FOREIGN PATENT DOCUMENTS

CN 206830963 U 1/2018
DE 1440153 A1 3/1969
(Continued)

OTHER PUBLICATIONS

International Search Report; Canadian Intellectual Property Office; International Application No. PCT/IB2019/061041; dated Apr. 17, 2020; 5 pages.
(Continued)

*Primary Examiner* — Nkeisha Smith
(74) *Attorney, Agent, or Firm* — Taft Stettinius & Hollister LLP (57) ABSTRACT

A clamping device for mounting at least one electrical conductor to a structure, including: a first clamping body and a second clamping body mountable together for holding the at least one electrical conductor therebetween, each of the first and second clamping bodies being provided with a clamping face having at least one recess thereon, with the at least one recess of the first and second clamping bodies together forming at least one damping aperture extending through the clamping device when the first and second bodies are secured together; and at least one damping device mountable around the at least one electrical conductor and insertable within the at least one damping aperture for
(Continued)

holding in position the at least one electrical conductor, and with the damping device having a predetermined resilience.

9 Claims, 5 Drawing Sheets

(51) Int. Cl.
*F16L 3/223* (2006.01)
*H02G 3/32* (2006.01)

(58) Field of Classification Search
USPC .............. 248/74.4, 68.1, 73, 74.3, 74.2
See application file for complete search history.

(56) References Cited

U.S. PATENT DOCUMENTS

| | | | | |
|---|---|---|---|---|
| 2,404,531 A * | 7/1946 | Robertson | ............ | F16L 3/2235 |
| | | | | 248/68.1 |
| 2,417,260 A * | 3/1947 | Morehouse | ............ | F16L 3/227 |
| | | | | 174/157 |
| 2,733,289 A | 1/1956 | Warren et al. | | |
| 2,761,714 A * | 9/1956 | Cuskie | ............ | B60G 21/0551 |
| | | | | 248/74.1 |
| 3,087,009 A | 4/1963 | Blanchet | | |
| 3,180,598 A * | 4/1965 | Girard | ............ | F16L 3/222 |
| | | | | 248/68.1 |
| 3,216,683 A * | 11/1965 | Girard | ............ | F16L 3/222 |
| | | | | 248/68.1 |
| 3,531,071 A * | 9/1970 | Kubli | ............ | F16L 3/2235 |
| | | | | 248/68.1 |
| 3,592,427 A * | 7/1971 | Misuraca | ............ | F16L 3/227 |
| | | | | 248/68.1 |
| 3,697,027 A * | 10/1972 | Girard | ............ | F16L 3/227 |
| | | | | 248/68.1 |
| 3,742,119 A * | 6/1973 | Newman | ............ | H02B 1/305 |
| | | | | 174/559 |
| 3,804,970 A * | 4/1974 | Oldman | ............ | H02G 5/06 |
| | | | | 174/88 B |
| 4,179,774 A * | 12/1979 | Bradbury | ............ | F16G 11/048 |
| | | | | 248/68.1 |
| 5,205,520 A * | 4/1993 | Walker | ............ | F16L 3/2235 |
| | | | | 248/68.1 |
| 5,377,939 A * | 1/1995 | Kirma | ............ | F16L 3/2235 |
| | | | | 248/68.1 |
| 5,435,506 A * | 7/1995 | Wiley | ............ | F16L 3/10 |
| | | | | 248/74.1 |
| 6,173,926 B1 * | 1/2001 | Elvegaard | ............ | F16L 3/1075 |
| | | | | 248/68.1 |
| 6,274,815 B1 | 8/2001 | Kawaguchi | | |
| 6,676,091 B2 * | 1/2004 | Hauer | ............ | F16L 3/1075 |
| | | | | 248/74.3 |
| 6,902,138 B2 * | 6/2005 | Vantouroux | ............ | F16L 3/1091 |
| | | | | 248/68.1 |
| 7,150,439 B2 * | 12/2006 | Konold | ............ | F16L 3/1075 |
| | | | | 248/74.1 |
| 7,288,730 B2 * | 10/2007 | Habel | ............ | H02G 3/22 |
| | | | | 174/152 G |
| 7,470,860 B2 * | 12/2008 | Lord | ............ | F03D 80/85 |
| | | | | 174/88 B |
| 7,770,848 B2 * | 8/2010 | Johnson | ............ | F16L 3/1207 |
| | | | | 248/65 |
| 7,806,374 B1 * | 10/2010 | Ehmann | ............ | H02G 3/22 |
| | | | | 174/64 |
| 7,922,012 B2 * | 4/2011 | Sisley | ............ | H02G 3/0406 |
| | | | | 248/74.1 |
| 8,226,052 B2 * | 7/2012 | Hancock | ............ | F16L 3/1091 |
| | | | | 248/62 |
| 8,267,357 B2 * | 9/2012 | Kataoka | ............ | B61D 49/00 |
| | | | | 248/68.1 |
| 8,348,204 B2 * | 1/2013 | Kataoka | ............ | B61D 49/00 |
| | | | | 248/68.1 |
| 8,616,506 B2 * | 12/2013 | Milton | ............ | H02B 1/305 |
| | | | | 248/65 |
| 8,985,533 B2 * | 3/2015 | Edmond | ............ | F16L 55/035 |
| | | | | 248/74.1 |
| 9,019,722 B2 * | 4/2015 | Parry-Jones | ............ | F02C 7/00 |
| | | | | 361/826 |
| 9,142,946 B2 * | 9/2015 | Krager | ............ | H02G 3/32 |
| 9,197,052 B2 * | 11/2015 | Kume | ............ | H02G 11/00 |
| 9,482,369 B2 * | 11/2016 | Sampson | ............ | F16L 3/237 |
| 9,601,241 B2 * | 3/2017 | Dannenberg | ............ | H02G 3/32 |
| 9,670,949 B1 * | 6/2017 | White | ............ | F16B 21/09 |
| 9,971,120 B2 * | 5/2018 | Rudenick | ............ | G02B 6/4452 |
| 9,982,824 B2 * | 5/2018 | Koenig | ............ | F16L 3/1075 |
| 10,077,677 B2 * | 9/2018 | Prestel | ............ | F01D 11/24 |
| 10,114,188 B2 * | 10/2018 | Miller | ............ | G02B 6/4471 |
| 10,309,553 B1 * | 6/2019 | Schwalbe | ............ | E02F 9/2275 |
| 10,408,365 B2 * | 9/2019 | McCarter | ............ | F16L 3/222 |
| 10,443,644 B2 * | 10/2019 | Hennon | ............ | F16L 3/1091 |
| 10,703,311 B2 * | 7/2020 | Davenport | ............ | F16L 3/237 |
| 10,717,589 B2 * | 7/2020 | Lu | ............ | B65D 85/20 |
| 10,800,540 B2 * | 10/2020 | Gilbertson | ............ | F16L 3/222 |
| 10,935,105 B2 * | 3/2021 | Bell | ............ | H02G 3/32 |
| 11,189,997 B2 * | 11/2021 | Yang | ............ | B60K 7/0007 |
| 2006/0027713 A1 | 2/2006 | van Walraven | ....... | F16L 3/1091 |
| | | | | 248/56 |
| 2007/0102184 A1 * | 5/2007 | Lord | ............ | F03D 80/85 |
| | | | | 174/68.2 |
| 2010/0122836 A1 | 5/2010 | Pollard, Jr. | | |
| 2011/0253846 A1 | 10/2011 | Kataoka et al. | | |
| 2015/0001351 A1 * | 1/2015 | Krager | ............ | H02G 3/32 |
| | | | | 248/49 |
| 2015/0096802 A1 * | 4/2015 | Itani | ............ | B60R 16/0215 |
| | | | | 174/72 A |
| 2015/0121676 A1 * | 5/2015 | Feige | ............ | F16L 55/035 |
| | | | | 248/614 |
| 2015/0152980 A1 * | 6/2015 | Okura | ............ | F16L 3/1083 |
| | | | | 248/74.2 |
| 2015/0192225 A1 * | 7/2015 | Vo | ............ | F16L 3/1091 |
| | | | | 29/466 |
| 2017/0030486 A1 * | 2/2017 | Sampson | ............ | F16L 3/2235 |
| 2017/0307109 A1 | 10/2017 | McCarter et al. | | |
| 2020/0161847 A1 * | 5/2020 | Hermey | ............ | H02G 3/22 |
| 2021/0151970 A1 * | 5/2021 | Robinson | ............ | H02G 3/30 |
| 2021/0222800 A1 * | 7/2021 | Koenig | ............ | F16L 3/237 |
| 2021/0262589 A1 * | 8/2021 | Holmberg | ............ | H02G 3/32 |

FOREIGN PATENT DOCUMENTS

| | | |
|---|---|---|
| JP | H03127435 U | 12/1991 |
| WO | 2016078631 A1 | 5/2016 |

OTHER PUBLICATIONS

Written Opinion of the International Searching Authority; Canadian Intellectual Property Office; International Application No. PCT/IB2019/061041; dated Apr. 17, 2020; 5 pages.
Ducluzaux; Extra losses caused in high current conductors by skin and proximity effects; Collection Technique; 2002; 22 pages.
Extended European Search Report; European Patent Office; European Application No. 19900093.6, dated Aug. 10, 2022, 12 pages.
Chinese Office Action; The State Intellectual Property Office of People's Republic of China; Chinese Application No. 201980092599.7; dated Aug. 19, 2022; 8 pages.

* cited by examiner

CLAMPING DEVICES

CROSS REFERENCE TO RELATED APPLICATIONS

This application is a U.S. National Phase of International PCT Application No. PCT/IB2019/061041 filed Dec. 18, 2019, which claims the benefit of U.S. Provisional Patent Application Ser. No. 62/781,211 filed Dec. 18, 2018, the contents of each application are incorporated herein by reference in their entirety.

TECHNICAL FIELD

The present invention generally relates to bus bars mounting structures, and more particularly to bus bars clamping devices suitable for use in wind turbine and other environments.

BACKGROUND

Inside buildings or tower structures such as wind turbine towers, electrical cables or rigid conductors are typically attached to the structure through cable trays or brackets along the length of the building/tower.

At least some wind turbine towers may be subject to vibrations of large amplitude and movements which may be as much as four inches on a twenty-foot section of tower. The electrical cables or conductors present inside the wind turbine are then subject to vibrations and the mounting structures of these electrical cables or conductors may break with time.

Various attempts have been made to reduce this drawback. For example, mounting brackets provided with spring elements mounted between the structure and the bracket have been proposed. Although it improves over rigid mounting structures, breaking still occurs with time.

Moreover, it is also well known that, when using arrangements having multiple conductors in close proximity, various electrical losses typically occur. For example, skin effect and proximity effect in the conductors may appear, leading to a voltage drop.

It would therefore be also desirable to provide an improved bus bars mounting structure.

SUMMARY

In accordance with a broad aspect, there is provided a clamping device for mounting at least one electrical conductor to a structure, the clamping device comprising: a first clamping body and a second clamping body mountable together for holding the at least one electrical conductor therebetween, each one of the first and second clamping bodies being provided with a clamping face having at least one recess thereon, the at least one recess of the first clamping body and the at least one recess of the second clamping body forming together at least one damping aperture extending through the clamping device when the first and second bodies are secured together; and at least one damping device mountable around the at least one electrical conductor and insertable within the at least one damping aperture for holding in position the at least one electrical conductor, the damping device having a predetermined resilience enabling to absorb relative movements between the first and second clamping elements and the at least one electrical conductor.

In one embodiment, at least one recess of the first clamping body comprises a single first recess, the at least one recess of the second clamping body comprises a single second recess and the at least one damping aperture comprises a single damping aperture.

In one embodiment, the at least one damping device comprises a first damping body insertable into the single first recess of the first clamping body and a second damping body insertable into the single second recess of the second clamping body.

In one embodiment, the first damping body is provided with at least one first recess and the second damping body is provided with at least one second recess, the at least one first recess and the at least one second recess forming at least one conductor receiving aperture each for receiving a respective one of the at least one electrical conductor when the first clamping body and the second clamping body are secured together.

In one embodiment, the first damping body comprises a first pair of lips for receiving the first clamping body therebetween and the second damping body comprises a second pair of lips for receiving the second clamping body therebetween.

In one embodiment, the at least one electrical conductor comprises a plurality of electrical conductors, the at least one recess of the first clamping body comprises a plurality of first recesses, the at least one recess of the second clamping body comprises a plurality of second recesses, and the at least one damping aperture comprises a plurality of damping apertures.

In one embodiment, the at least one damping aperture comprises a plurality of hollow damping bodies each for receiving a respective one of the plurality of electrical conductors and each insertable into a respective one of the plurality of damping apertures.

In one embodiment, each one of the plurality of hollow damping bodies is provided with a pair of lips for receiving the first clamping body and the second clamping body therebetween.

In one embodiment, each one of the plurality of hollow damping bodies is provided with a slit extending along a length thereof for allowing insertion of the respective one of the plurality of electrical conductors therein.

In one embodiment, the at least one damping device is made of rubber.

In one embodiment, the at least one damping device is made of Ethylene Propylene Diene Monomer (EPDM) rubber.

In one embodiment, the at least one electrical conductor comprise at least one bus bar conductors.

In one embodiment, the at least one of the at least one bus bar conductors has a tubular shape.

In accordance with another broad aspect, there is provided a clamping device for attaching a plurality of tubular electrical conductors to a structure, the clamping device comprising: a first clamping body and a second clamping body mountable together for holding the plurality of tubular electrical conductors therebetween, each one of the first and second clamping bodies being provided with a clamping face having a predetermined shaped surface for defining a plurality of apertures extending through the clamping device when the first and second bodies are secured together, each one of the plurality of apertures being adapted for receiving a respective one of the plurality of tubular electrical conductors; wherein a ratio between an outer diameter and a wall thickness of the electrical conductors being equal to at least eight and the plurality of apertures being located so that a distance between centers of two adjacent ones of the tubular electrical conductors be equal to at least 2.5 times the outer diameter of the tubular electrical conductors.

In one embodiment, the recesses of the first clamping body and the recesses of the second clamping body are located so that the apertures are arranged in one of a triangular arrangement, a linear arrangement and a square arrangement.

In one embodiment, the clamping device further comprises at least one damping device provided with a plurality of conductor receiving holes each for receiving a respective one of the tubular electrical conductors.

BRIEF DESCRIPTION OF THE DRAWINGS

In order that the invention may be readily understood, embodiments of the invention are illustrated by way of example in the accompanying drawings.

Further details of the invention and its advantages will be apparent from the detailed description included below.

DETAILED DESCRIPTION

In the following description of the embodiments, references to the accompanying drawings are by way of illustration of examples by which the invention may be practiced. It will be understood that other embodiments may be made without departing from the scope of the invention disclosed.

In one embodiment, the present clamping devices for bus bars are particularly well suited for use in various structures subjected to amplitude vibrations and movements, such as wind turbines as a non-limitative example.

As it should become apparent upon reading of the present description, the bus bars clamping devices described below enable to reduce or minimize breaks that could occur under repeated or continued vibrations conditions, which may result in an increased lifetime.

Typically, in a wind turbine, several rigid electrical conductors are used for conveying power generated from the generator usually located at the top of a wind turbine such as in a wind turbine nacelle to a power grid usually located the bottom of the wind turbine. The rigid electrical conductors are generally arranged substantially parallel to each other in a predetermined spatial relationship along a conductor path, according to a given application. The rigid electrical conductors are typically tubular conductors surrounded by an insulation tube or sleeve.

Figure 1:
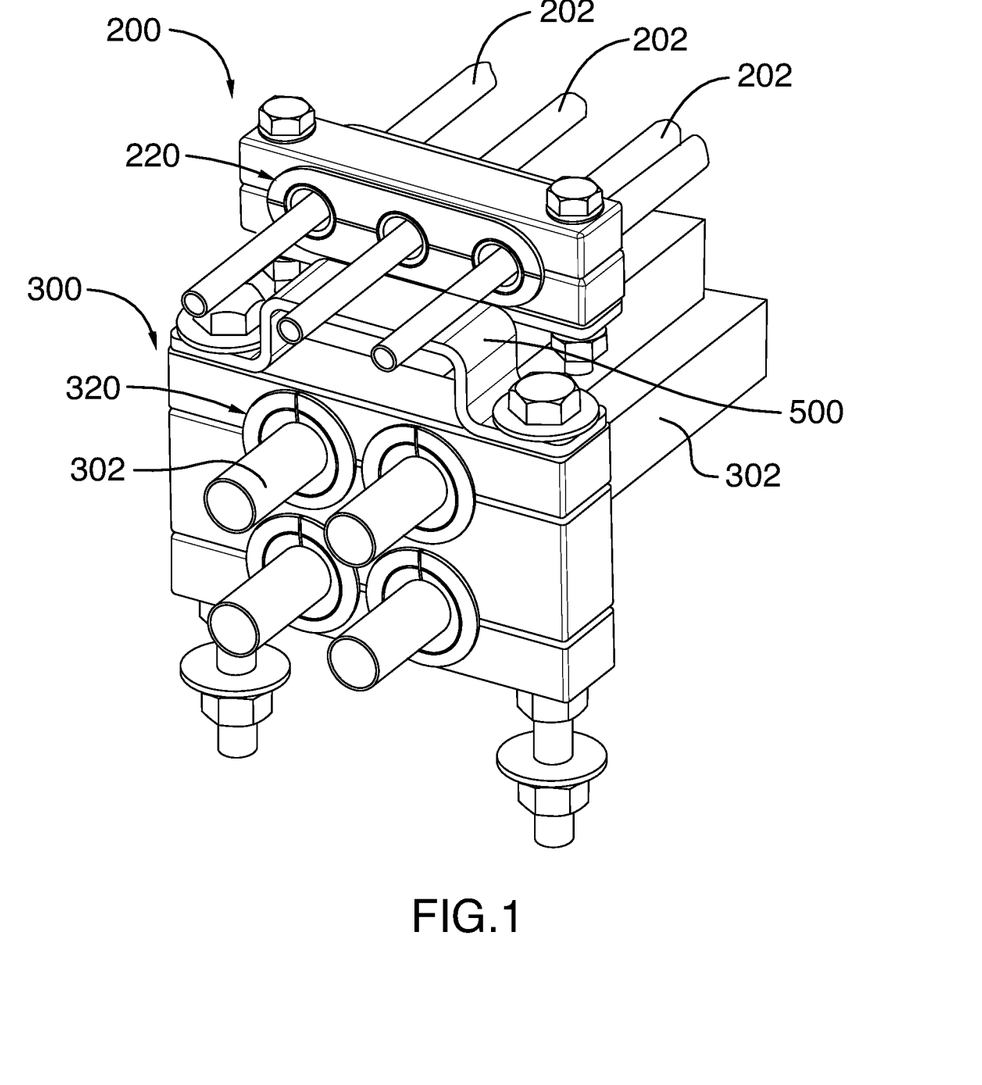
FIG. 1 is a perspective elevated view of a first bus bars clamping device for attaching 3 rigid electrical conductors to a structure (not shown), according to one embodiment and of a second bus bars clamping device for attaching 4 rigid electrical conductors to the same structure, according to another embodiment.

FIG. 1 illustrates one embodiment of a first clamping device 200 for attaching three rigid electrical conductors 202 to a structure (not shown) and one embodiment of a second clamping device 300 for attaching four rigid electrical conductors 302 to the same structure or another structure. The structure, which can be a wind tower or a building for example, or connected within a wind tower or a building for example, may be provided with brackets spaced along a conductor path and to which the clamping devices 200 and 300 may be attached, although various other arrangements may also be considered. For example, a rack or a tray provided with rungs to which the conductors are to be attached may be used.

Figure 2A:
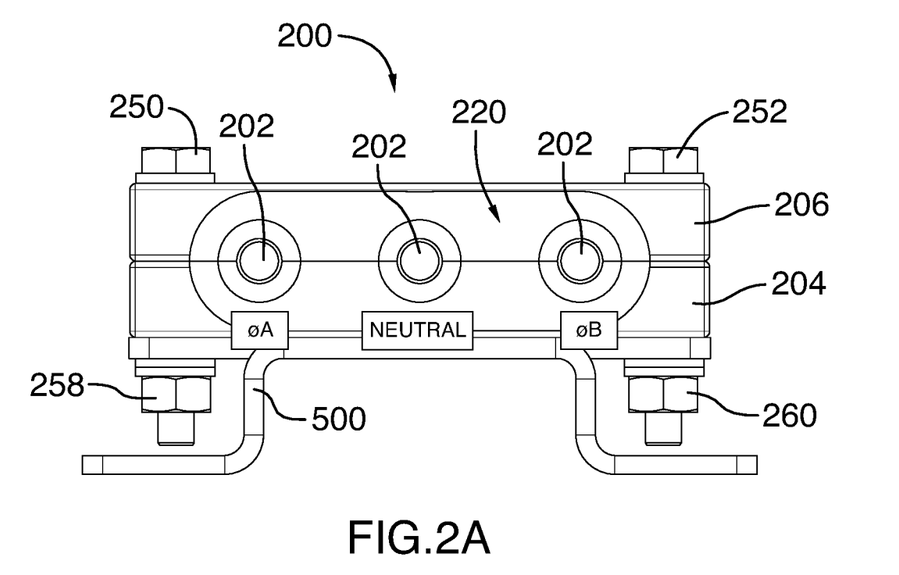
FIG. 2A is a front view of the first bus bars clamping device of FIG. 1.

Referring now to FIGS. 1 and 2A, the first clamping device 200 for attaching three rigid electrical conductors 202 to a structure will now be described. Although this illustrated bus bars clamping device 200 is used for attaching three rigid electrical conductors 202 in a linear/coplanar spatial configuration, it may also be used for attaching any number of electrical conductors 202 in any configuration, according to a given application. Although electrical conductors conveying power in a structure are generally used in sets of three or four for example, the bus bars clamping device 200 may also be used for attaching a single electrical conductor 202 to the structure. In one embodiment, one may consider using distinct bus bars clamping devices 200 mounted one next to the other, one for each conductor 202, as it will become apparent below.

In the illustrated embodiment, the clamping device 200 has a first clamping element/body 204 and a second clamping element/body 206 mountable together for holding three rigid electrical conductor 202 therebetween. As better shown in FIG. 2B, each of the clamping elements 204 and 206 comprises a clamping face 210 having a predetermined shaped surface 212 defining a recess 214. The predetermined shaped surfaces 212 of the first and second clamping elements 204 and 206 face each other when the first and second clamping elements 204 and 206 are secured together. When the clamping elements 204 and 206 are secured together to form an assembly, the recesses 214 which face each other form an aperture which extends through the thickness of the assembly between the surfaces 212. In the illustrated embodiment, the shaped surfaces 212 of the clamping faces 210 are each defined by a rounded cut-out portion defining a corresponding jaw. While in the illustrated embodiment, the recesses 214 are provided with a substantially rectangular shape having rounded edges, it should be understood that any other adequate shape such as a semicircular shape or a square shape may be used.

Figure 2B:
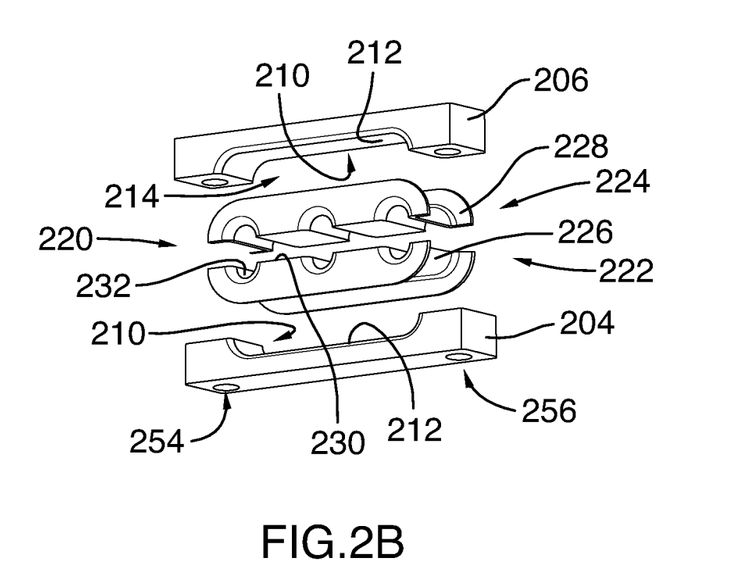
FIG. 2B is a perspective exploded view of a portion of the first bus bars clamping device of FIG. 1.

In the illustrated embodiment, the clamping device 200 further comprises a damping device/body 220 mounted within the conductor aperture formed when the first and a second clamping elements 204 and 206 are secured together. The damping device 220 is sized and shaped receiving therein and holding in position the three rigid electrical conductors 202 therethrough.

As better shown in FIG. 2B, in the illustrated embodiment, the damping device 220 is made of two identical half portions/bodies 222 and 224 that are held together around the three conductors 202 between the first and second clamping elements 204, 206. Each half portion 222, 224 is shaped and sized so as to be received in the recess 214 of a respective clamping element 204, 206.

In the illustrated embodiment, each half portion 222, 224 has an outer face 226 of which the shape matches that of the shaped surface 212 of the corresponding clamping face 210, i.e. the outer face 226 of the half portion 222, 224 matches that of the recess 214 of the corresponding clamping element 204, 206. As a result, each half portion 222, 224 fits snuggingly within the recess 214 of the corresponding clamping element 204, 206. However, it should be understood that the shape of the outer face 226 of the half portion 222, 224 may not match that of the recess 214 of the clamping element 204, 206 as along as each half portion 222, 224 may be received and maintained in position within the recess 214 of its corresponding clamping element 204, 206.

In one embodiment such as in the illustrated embodiment, the clamping element 222, 224 is further provided with a pair of lips 228 projecting from the outer face 226 thereof on opposite side thereof to hold the clamping element 222, 224 in position inside the respective clamping elements 204, 206, even in case of strong vibrations. The space defined between each pair of lips 228 is sized and shaped for receiving a respective clamping element 204, 206 therebetween.

In another embodiment, the lips 228 are omitted.

Each half portion 222, 224 is also provided with a jaw face 230 opposite to the outer face 226 and shaped and sized for partially receiving the conductors 202 therein. In the illustrated embodiment, the jaw face 230 is provided with three spaced apart arcuate cut out portions or recesses 232. Each portion 232 is sized and shaped so as to receive a respective half of a conductor 202 therein. In the illustrated embodiment, the size and shape of each portion 232 match the size and shape of half of a conductor 202 so that the conductor 202 may fit snuggingly into the portion 232.

While in the illustrated embodiment, each portion 232 is sized and shaped for snuggingly receiving therein half of a conductor 202, it should be understood that other configurations may be possible. For example, each portion 232 may be sized and shaped for receiving therein less than half of a conductor 202.

As illustrated in FIG. 2A, once the clamping device 200 is assembled, each conductor 202 is completely surrounded or wrapped in the damping device 220 and the conductors 202 are held in position.

In an embodiment in which each portion 232 is be sized and shaped for receiving therein less than half of a conductor 202, only two sections of the circumference of the conductors is surrounded and in physical contact with the damping device 220 while still being held in position within the apertures formed by two opposite recesses 232.

In one embodiment, the damping device 220 is made of a material having a predetermined resilience allowing the absorption of shocks, relative movements or vibrations between the clamping elements 204 and 206 secured to the structure and the electrical conductors 202 mounted therein. The predetermined resilience may be determined according to a given application in order to provide a sufficient damping effect adequate for conveniently absorbing/reducing/minimizing the vibrations of the structure, but also for providing a sufficient stiffness to the damping device 220 enabling to put sufficient load on the conductors 202 to secure their respective position.

In one embodiment, the damping device 220 is made of rubber. In a further embodiment, it is are made of EPDM (Ethylene Propylene Diene Monomer) rubber. In still a further embodiment, the material base of the damping device 220 is an EPDM having a modified formula enabling to increase dielectric characteristics such as creepage resistance, voltage resistance and resistance to possible contaminants that may be present in a wind tower such as oil, UV, water for non-limitative examples. In a further embodiment, the stiffness of the damping device 220 is determined according to the tower vibration modes, natural frequencies and bus bars length. Depending of the system voltage of a given application, the damping device thickness and specific shape may be defined to meet the required dielectric properties such as creepage distance and basic impulse.

In the illustrated embodiment, the portions 222 and 224 of the damping device 220 are obtained by extrusion but other fabrication methods may be considered, as detailed below. For example, the portions 222 and 224 may be molded.

Referring back to FIGS. 2A and 2B, in one embodiment, the first and second clamping elements 204 and 206 are clamped together with a fastening arrangement. In the illustrated embodiment, a first and a second fasteners 250 and 252 provided with a threaded stem are each inserted into a corresponding channel 254, 256 provided in each of the first and second clamping elements 204 and 206 and are secured in position each with a corresponding bolt 258, 260. Various other fastening arrangements may be considered, as it should be apparent to the person skilled in the art.

In order to assemble the clamping device 200, each portion 224, 226 is inserted into the recess 214 of a respective clamping element 204, 206. The conductors 202 are each positioned in a respective recess 232 of a first portion 224, 226 and the second portion 224, 226 is positioned over the first portion 224, 226 so that the conductors be inserted into the recesses 232 of the second portion 224, 226. The clamping elements 206 and 204 are then secured together.

While in the above-described clamping device 200, the clamping element 204, 206 is provided with a single recess 214, it should be understood that other configurations may be possible. For example, each clamping element 204, 206 may be provided with more than one recess 214 each designed for receiving therein a respective portion 224, 226 that is designed for receiving at least one conductor 202.

While the conductors 202 have a circular cross-section and portions 222 and 224 are provided with semicircular recesses 232, it should be understood that the conductors 202 may be provided with any other adequate cross-sectional shape and the recesses 232 may be provided with a shape that matches that of the conductors 202.

Figure 3A:
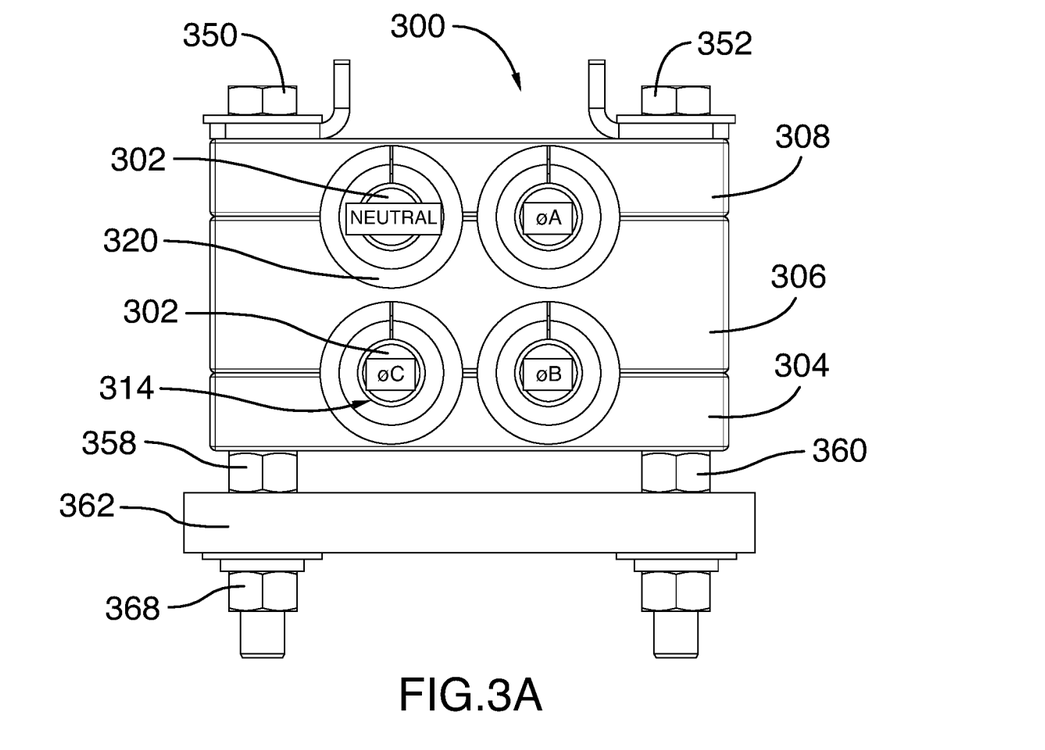
FIG. 3A is a front view of the second bus bars clamping device of FIG. 1.
Figure 3B:
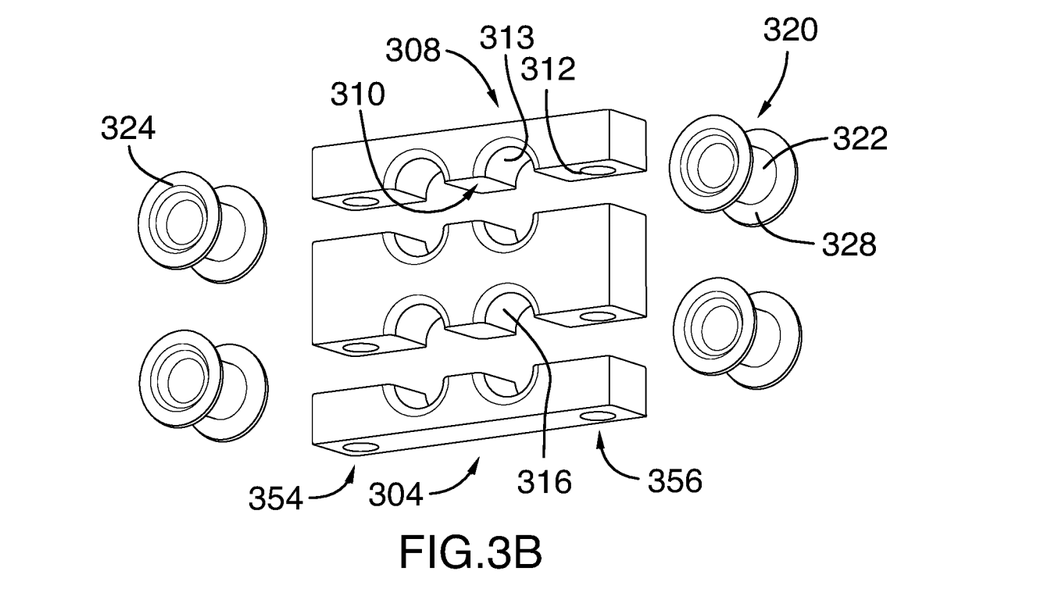
FIG. 3B is a perspective exploded view of a portion of the second bus bars clamping device of FIG. 1.

Referring now to FIGS. 3A and 3B and also to FIG. 1, the second clamping device 300 for attaching four electrical conductors 302 to a structure is now described, according to one embodiment. Although this illustrated clamping device 300 is used for attaching four electrical conductors 302 in a square spatial configuration, it may be modified for attaching any number of electrical conductors in any adequate spatial configuration depending on the given application.

In this illustrated embodiment, the clamping device 300 has a first, a second and a third clamping elements 304, 306 and 308 stackably mountable together for holding the four electrical conductors 302 therebetween so that the clamping element 306 be sandwiched between the clamping elements 304 and 308. Two conductors 302 are mounted between the first and the second clamping elements 304 and 306, each in a corresponding conductor aperture 314, while the two other conductors 302 are mounted between the second and the third clamping elements 306 and 308, each in a respective conductor aperture 314.

As better shown in FIG. 3B, each one of the two clamping elements 304 and 308 mounted outwardly has a clamping face 310 having a predetermined shaped surface 312 provided with have two spaced apart arcuate cut-out portions or two recesses 313 defining a jaw while the clamping element 306 mounted between the first two clamping elements 304 and 308 has two opposite clamping faces 310, each provided with a predetermined shaped surface provided with two spaced apart arcuate cut-out portions recesses 316 defining a jaw. The jaws, once mounted together, define four distinct cylindrical conductor apertures 314 which each extend through the assembly formed by the clamping elements 304, 306 and 308 and are configured for receiving therein a respective conductor 302.

In this embodiment, the clamping device 300 is also provided with four damping devices 320, each being mounted within a respective conductor aperture 314 for receiving and holding in position the respective electrical conductors 302 therethrough, when the clamping device 300 is assembled.

As better shown in FIG. 3B, each damping device 320 is made of a tubular portion 322 having a longitudinal slit 324 adapted for opening the tubular portion 322 in order to insert a respective conductor 302 therein. The outer surface of the tubular portion 322 is sized and shaped to snuggingly fit in a corresponding conductor aperture 314. The ends of the tubular portion 322 are each provided with a lip 328 projecting outwardly and radially to hold the damping device 320 in position inside a respective aperture 314 defined in the assembly formed by the clamping elements 304, 306 and 308, even in case of strong vibrations. Other arrangements may be considered to retain the damping device 320 in its position. For example, a rib on the outer surface of the damping device 320 inserted into a corresponding groove inside the conductor aperture 314 may be used.

It should be understood that once the conductors 302 are mounted with the clamping device 300, each of the conductors 302 is completely surrounded or wrapped in its own damping device 320 and is held in position both vertically and horizontally.

As previously mentioned, the predetermined resilience of the damping devices should be determined according to a given application in order to provide a sufficient damping effect effective to conveniently absorb the vibrations or movements of the structure, but also to provide a sufficient stiffness to the damping device 320 enabling to put sufficient load on the corresponding conductor 302 to secure its respective position. In one embodiment, the material of the damping devices is further chosen so as to be electrically insulating.

In one embodiment, the damping device 320 is made of modified rubber, as described above.

In the illustrated embodiment, the damping device 320 is obtained by extrusion in a cylindrical shape. Other arrangements may be considered. For example, the damping device 320 may be made of two U-shaped half portions mounted together. Alternatively, the damping device 320 may be a flat element that is wrapped around the corresponding conductor 302 and fitted in the corresponding aperture 314 during conductors mounting.

Referring again to FIGS. 3A and 3B, the first, second and third clamping elements 304, 306 and 308 are clamped together with a fastening arrangement. In the illustrated embodiment, a first and a second fasteners 350 and 352 provided with a threaded stem pass through a corresponding channel 354, 356 made in each of the clamping elements 304, 306 and 308 and are secured in position with corresponding bolts 358, 360. Various other fastening arrangements may be considered, as it should be apparent to the skilled addressee.

In one embodiment, as illustrated, the first and second fasteners 350 and 352 may also be used to secure the bus bars clamping device 300 to the structure. In the illustrated embodiment, the structure is provided with a bracket 362 attached thereto. The two fasteners 350 and 352 are inserted through a corresponding channel provided in the bracket 362 in alignment with a respective channel 354, 356 of the clamping elements 304, 306, 308 and then secured in position with bolts 368. Resilient washer may be mounted with the fasteners to further absorb vibrations, as known in the art.

It should be understood that the number of recesses 313 and 316 may vary as along as the clamping elements 304 and 308 are each provided with at least one recess 313 and the clamping element 306 is provided with at least one recess 316 on each one of its opposite faces 310. For example, each clamping element 304, 308 may be provided with a single recess adapted to receive a damping device similar to the portion 222, 224 provided with two recesses and the clamping element 306 may be provided with a single recess on each one of its opposite face and each recess id adapted to receive a damping device similar to the portion 222, 224 provided with two recesses.

Figure 4A:
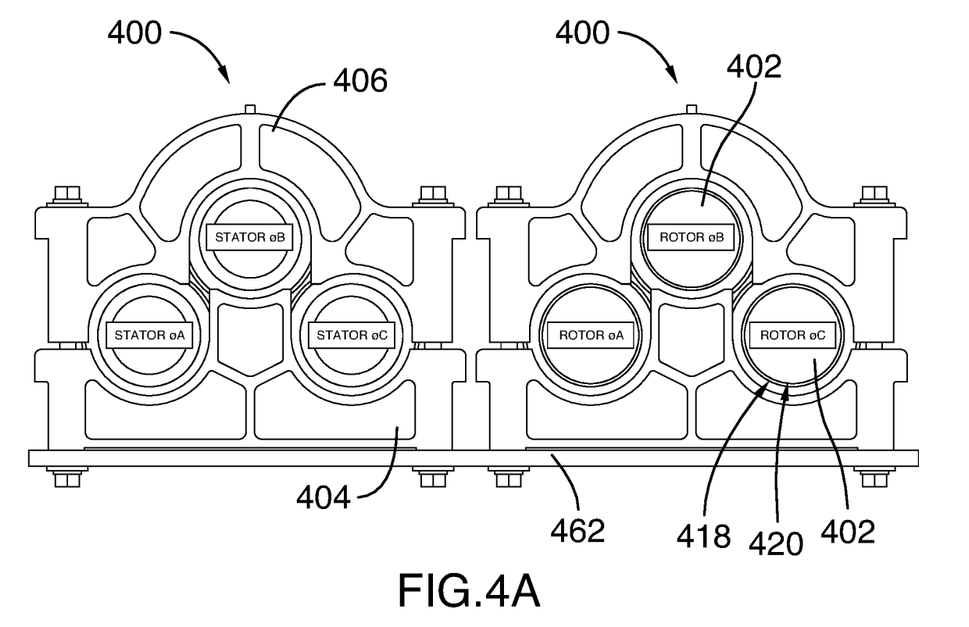
FIG. 4A is a front view of two bus bars clamping devices for attaching two sets of 3 rigid electrical conductors to a structure, according to another embodiment.
Figure 4B:
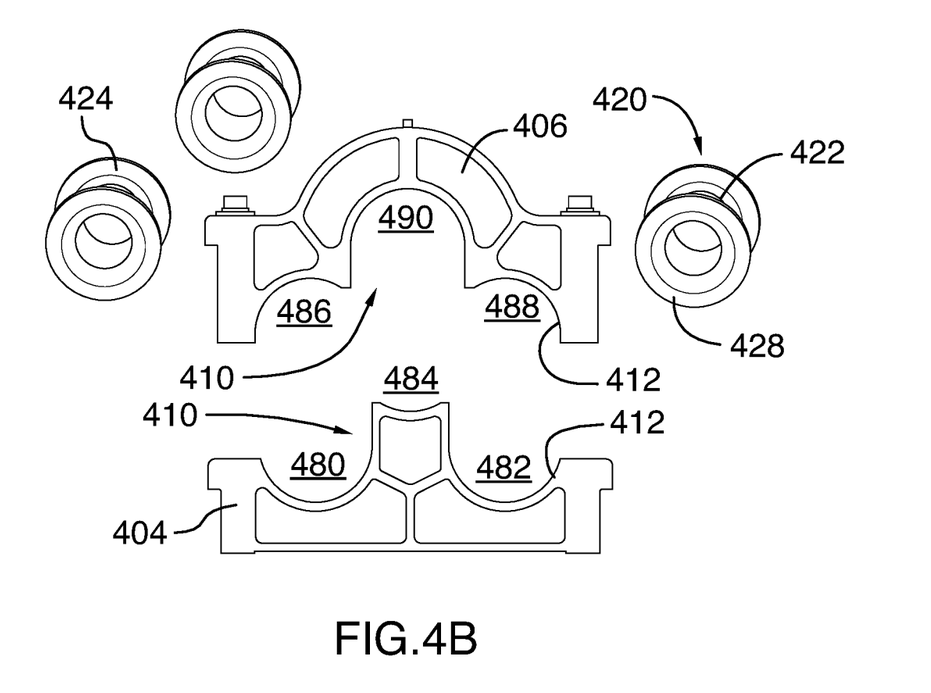
FIG. 4B is an exploded view of a portion of one of the bus bars clamping devices of FIG. 4A.

Referring now to FIGS. 4A and 4B, another clamping device 400 for attaching three electrical conductors 402 to a structure in a triangular spatial configuration will now be described, according to another embodiment. In the embodiment illustrated in FIG. 4A, two distinct clamping devices 400 are shown, each having a first and a second clamping elements 404, 406 mountable together for holding the three electrical conductors 402 therebetween, each in a corresponding conductor aperture 418.

The two clamping devices 400 are mounted side by side and are each secured to a structure 462 with fastenings arrangements, as previously described.

Each of the clamping elements 404, 406 has a clamping face 410 having a predetermined shaped surface 412. In one embodiment, as illustrated, the shaped surface 412 of the first clamping element 404 has two spaced apart arcuate cut-out portions 480, 482 and a raised arcuate portion 484 extending therebetween while the shaped surface 412 of the second clamping element 406 has two spaced apart raised arcuate cut-out portions 486, 488 and a recessed arcuate portion 490 extending therebetween. The shaped surfaces 412, mounted together, define three distinct cylindrical conductor apertures 418 through the clamping elements 404, 406.

In this embodiment, the clamping device 400 is also provided with three damping devices 420, each being mounted within a respective one conductor aperture 418 for receiving and holding in position the respective rigid electrical conductor 402 therethrough. In one embodiment, each damping device 420 is made of a tubular portion 422 having a longitudinal slit 424 adapted for opening the tubular portion 422 for conductors mounting. The ends of the tubular portion 422 are provided with lips 428 projecting radially and outwardly on each side thereof to hold the damping device 420 in position inside the clamping elements 404, 406, even in case of strong vibrations.

In one embodiment, the slit 424 is omitted. In this case, the conductor 402 is inserted into the aperture defined by the tubular damping device 420 and slipped along the conductor 420 up to a desired position therealong.

As it can be seen, in this embodiment, once the conductors 402 are mounted with the clamping device 400, each of the conductors 402 is completely surrounded or wrapped in its own damping device 420 and is held in position both vertically and horizontally.

According to another aspect, there is also provided a bus bars clamping device for attaching a plurality of rigid electrical conductors to a structure, which is particularly devised to minimize voltage drop and electrical losses that may occur in multiple rigid electrical conductor arrangements.

More particularly, the inventors of the present technology have discovered that when the conductors have a tubular shape defined by an inner diameter, an outer diameter and a wall thickness, i.e. the difference between the outer radius and the inner radius, particular arrangements wherein the ratio between the outer diameter and the wall thickness of the tubular conductors and the relative distance between each of the conductors are particularly chosen enable to reduce or substantially eliminate the skin effect and the proximity effect in the conductors. The voltage drop is also reduced compared to arrangements presently used in the art.

As it will become apparent below, the clamping devices 200, 300, 400 shown in FIG. 1 through FIG. 4B can be easily adapted for that purpose.

Referring again to FIG. 4A and FIG. 4B, according to one embodiment, the clamping device 400 has a first and a second clamping elements 404, 406 mountable together for holding the rigid electrical conductors 402 therebetween. Each of the clamping elements 404, 406 has a clamping face 410 having a predetermined shaped surface 412 for defining at least one conductor aperture 418 through the clamping elements 404, 406 when the clamping faces 410 are mounted facing together. In the illustrated embodiment and as previously described, the clamping faces 410 define three distinct tubular conductor apertures 418 arranged in a triangular spatial relationship. Each of the tubular electrical conductors 402 has a predetermined outer diameter and a predetermined wall thickness. A ratio of the outer diameter with respect to the wall thickness is chosen to be at least equal to 8.0. Moreover, the conductors 402 are held between the clamping elements 404, 406 at a predetermined relative distance between each other. The predetermined relative distance, i.e., the distance between the centers of two adjacent conductors 402, is at least equal to 2.5 times the outer diameter of the corresponding electrical conductors 402. It should be understood that the desired distance between the centres of two adjacent conductors is obtained by adequately choosing the location of the apertures in which the conductors are inserted, i.e. the distance between the centres of two adjacent apertures is equal to the desired distance between two adjacent conductors. Tests have shown that such bus bars arrangement can reduce by at least 8% the electrical losses for the same quantity of conductive material used.

In one embodiment, such an arrangement for reducing electrical losses and voltage drop may be used for any of a linear, a square or a triangular spatial configuration of the electrical conductors, as the configurations illustrated in FIGS. 1 to 4A for non-limitative examples. FIG. 2A shows a three conductors linear configuration using two phase conductors and a neutral conductor located therebetween but an alternative configuration using three phase conductors may also be considered. FIG. 3A shows a four conductors square configuration using three phase conductors and a neutral conductor. FIG. 4A shows a configuration using two sets of conductors arranged in a triangular spatial configuration and using three phase conductors. In FIG. 1, there is two sets of conductors, a first set of three conductors linearly arranged and a second set of four conductors arranged in square. One can see that the diameter of the conductors of the second set is larger than the diameter of the conductors of the first set. In fact, these conductors have a diameter, and also a wall thickness that is calculated specifically to carry the proper current load, as it should be apparent to the skilled addressee.

With the proposed arrangement, since electrical losses and voltage drop are reduced, less material is required to carry the same power. The weight of the components used for conveying electrical power is thus reduced, which is of great advantage, particularly in tall or long structures subjected to a harsh vibration environment. The cost of the conductors arrangement may also be minimized.

As it should be apparent, the two aspects of the present invention may be combined. Indeed, the bus bars clamping device devised to minimize electrical losses may also use damping devices having a predetermined resilience enabling to absorb/reduce/minimize relative movements between the clamping elements and the corresponding rigid electrical conductor, as detailed above.

Figure 5:
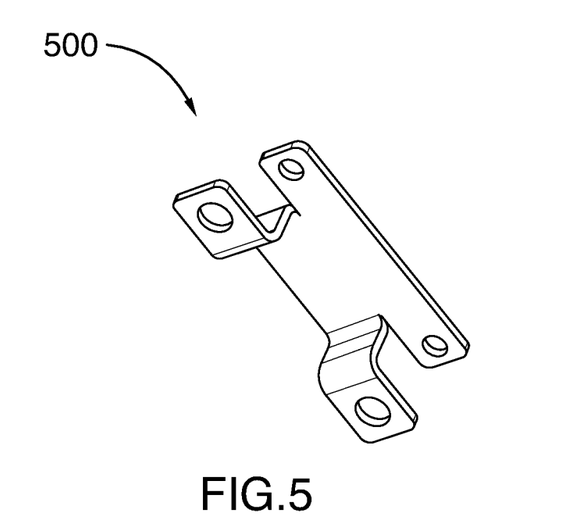
FIG. 5 is a perspective bottom view of a bracket illustrated in FIG. 1 for mounting the first and second bus bars clamping devices together, according to one embodiment.

FIG. 5 illustrates a mounting bracket 500 that can be used in the arrangement shown in FIG. 1 for mounting the first clamping device 200 on the second clamping device 300, this latter being directly secured to the structure. Such arrangement may be of great advantage to reduce overall dimensions of a specific electrical arrangement requiring the use of several set of electrical rigid conductors.

While the damping device 420 is tubular for being mounted around a cylindrical or tubular conductor, it should be understood that a damping device 420 may have any other adequate shape as long as it is hollow for receiving therein a conductor.

In one embodiment, the shape and size of the aperture defined by the hollow damping device correspond to the shape and size of the conductor.

In one embodiment, the conductors 202, 302, 402 are bus bar electrical conductors and the clamping device 200, 300, 400 then corresponds to a bus bar clamping device.

Although the above description relates to specific preferred embodiments as presently contemplated by the inventors, it will be understood that the invention in its broad aspect includes mechanical and functional equivalents of the elements described herein. For example, although the aspects of the invention have been mainly described for use in a wind turbine or a section thereof, it can also be used in various other structures such as tall buildings or any structure wherein vibrations are present.

What is claimed is:

1. A clamping device for mounting a plurality of electrical conductors to a structure, the clamping device comprising:
 a first clamping body and a second clamping body mountable together for holding the plurality of electrical conductors therebetween in one of a triangular arrangement and a square arrangement thereby reducing electrical losses and voltage drops, each one of the first and second clamping bodies being provided with a clamping face having a plurality of recesses thereon, the plurality of recesses of the first clamping body and the plurality of recesses of the second clamping body forming together a plurality of damping apertures extending through the clamping device when the first and second clamping bodies are secured together; and
 a plurality of damping devices for mounting around the plurality of electrical conductors and insertable within the plurality of damping apertures for holding in position the plurality of electrical conductors, the plurality of damping devices having a predetermined resilience enabling to absorb relative movements between the first and second clamping bodies and the plurality of electrical conductors; and wherein the plurality of damping apertures are located so that a distance between centers of two adjacent ones of the plurality of electrical conductors is equal to at least 2.5 times an outer diameter of the plurality of electrical conductors.

2. The clamping device of claim 1, wherein the plurality of damping apertures comprises a plurality of hollow damping bodies each for receiving a respective one of the plurality of electrical conductors and each insertable into a respective one of the plurality of damping apertures.

3. The clamping device of claim 2, wherein each one of the plurality of hollow damping bodies is provided with a pair of lips for receiving the first clamping body and the second clamping body therebetween.

4. The clamping device of claim 2, wherein each one of the plurality of hollow damping bodies is provided with a slit extending along a length thereof for allowing insertion of the respective one of the plurality of electrical conductors therein.

5. The clamping device of claim 1, wherein the plurality of damping devices are made of rubber.

6. The clamping device of claim 5, wherein the plurality of damping devices are made of Ethylene Propylene Diene Monomer (EPDM) rubber.

7. The clamping device of claim 1, wherein each of the plurality of electrical conductors comprises at least one bus bar conductor.

8. The clamping device of claim 7, wherein the at least one bus bar conductor has a tubular shape.

9. A system comprising a plurality of electrical conductors and a clamping device according to claim 1 wherein a ratio between an outer diameter and a wall thickness of the electrical conductors is equal to at least eight.

\* \* \* \* \*